United States Patent

Memmel et al.

[11] Patent Number: 5,617,939
[45] Date of Patent: Apr. 8, 1997

[54] FRICTION CLUTCH ASSEMBLY FOR A MOTOR VEHICLE, THE FRICTION CLUTCH ASSEMBLY HAVING A CLUTCH PLATE WITH DIVIDED HUB DISC

[75] Inventors: Klaus Memmel, Gädheim; Jürgen Kleifges, Schweinfurt; Reinhard Feldhaus, Ebenhausen; Harald Jeppe, Schweinfurt, all of Germany

[73] Assignee: Fichtel & Sachs AG, Schweinfurt, Germany

[21] Appl. No.: 518,789

[22] Filed: Aug. 23, 1995

[30] Foreign Application Priority Data

Aug. 23, 1994 [DE] Germany .......................... 44 29 870.6

[51] Int. Cl.⁶ ................ F16D 3/14; F16D 13/58
[52] U.S. Cl. ............. 192/70.16; 192/204; 192/206; 464/68
[58] Field of Search ............. 192/70.16, 204, 192/206, 212, 214; 464/66, 68

[56] References Cited

U.S. PATENT DOCUMENTS

| | | | |
|---|---|---|---|
| 4,418,812 | 12/1983 | Lech, Jr. ............. | 192/206 |
| 4,461,376 | 7/1984 | Lech, Jr. et al. . | |
| 4,537,296 | 8/1985 | Lech, Jr. et al. ....... | 192/206 |
| 4,613,029 | 9/1986 | Beccaris ............. | 192/70.16 X |
| 4,651,859 | 3/1987 | Frantz et al. ........... | 192/206 |
| 4,792,030 | 12/1988 | Huber et al. . | |
| 5,117,959 | 6/1992 | Graton . | |
| 5,169,357 | 12/1992 | Graton ................. | 464/68 |
| 5,217,409 | 6/1993 | Dalbiez ................ | 464/68 |
| 5,246,398 | 9/1993 | Birk et al. ............. | 192/204 X |
| 5,249,660 | 10/1993 | Feldhaus et al. ....... | 192/204 |
| 5,251,736 | 10/1993 | Jeppe et al. . | |

FOREIGN PATENT DOCUMENTS

| | | |
|---|---|---|
| 0086044 | 8/1983 | European Pat. Off. . |
| 0093176 | 11/1983 | European Pat. Off. . |
| 0586290 | 3/1994 | European Pat. Off. . |
| 1425185 | 10/1968 | Germany . |
| 2814240 | 10/1978 | Germany . |
| 3442705 | 5/1986 | Germany . |
| 2118273 | 10/1983 | United Kingdom . |
| 2165336 | 4/1986 | United Kingdom . |
| 2184812 | 7/1987 | United Kingdom . |
| 2237357 | 5/1991 | United Kingdom . |

*Primary Examiner*—Andrea L. Pitts
*Attorney, Agent, or Firm*—Nils H. Ljungman and Associates

[57] ABSTRACT

A clutch plate having a hub and hub disc which are manufactured from two individual parts, wherein the two parts are non-rotationally connected by means of gear teeth so that there is essentially no play in the circumferential direction. Either the lining carrier or cover plate or both can thereby be guided with respect to a guide diameter of the hub by means of a plastic metal friction or sliding pair.

17 Claims, 8 Drawing Sheets

5,617,939

FRICTION CLUTCH ASSEMBLY FOR A MOTOR VEHICLE, THE FRICTION CLUTCH ASSEMBLY HAVING A CLUTCH PLATE WITH DIVIDED HUB DISC

BACKGROUND OF THE INVENTION

1. Field of the Invention

The present invention generally relates to a clutch plate for a friction clutch, the friction clutch comprising a clutch with internal gear teeth for non-rotational attachment to a transmission input shaft which transmission input shaft defines an axis of rotation. The friction clutch can also include a hub and a hub disc which hub disc is non-rotationally connected to the hub, sheet metal parts in the form of a lining carrier and a cover plate located one on either side of the hub disc. The lining carrier and cover plate can be non-rotationally connected to one another and can be held at a distance from one another. The lining carrier can have friction linings, which friction linings are located radially outward on the lining carrier. There can preferably be apertures in the lining carrier and cover plate on one hand, and in the hub disc on the other hand, to hold springs which make possible a relative rotation between the friction linings and the hub when torque is exerted.

2. Background Information

Such a clutch plate is disclosed, for example, in German Patent 14 25 185. German Patent 14 25 185 discloses that on a clutch plate, the hub and hub disc can be manufactured on a single component, and corresponding to some of the hub discs, there can be a lining carrier or a cover plate, which can be non-rotationally connected to one another and held at a distance from one another. There is a friction device in the area radially inside the torsion springs.

German Unexamined Patent Application 28 14 240 also discloses that the hub disc can be realized in the form of a divided clutch plate, with gear teeth which allow some play in the circumferential direction, whereby the play defines the range of action of an integrated idle damper. In this case, the lining carrier is guided in the vicinity of its inside diameter by means of an L-shaped bearing ring with respect to the hub.

German Unexamined Patent Application 34 42 705 also discloses that on a clutch plate with an idle damper and a two-part hub, and with gear teeth and play in the circumferential direction, the cover plate can be guided with respect to the hub by means of an L-shaped bearing ring.

OBJECT OF THE INVENTION

The object of the present invention is to manufacture a clutch plate which is as economical and functional as possible for a friction clutch with a torsional vibration damper.

SUMMARY OF THE INVENTION

The present invention teaches that this object can be accomplished, in accordance with at least one preferred embodiment, by the hub disc being engaged by means of an internal contour, in particular internal gear teeth, non-rotationally and without play in the circumferential direction in a corresponding external contour of the hub, in particular corresponding external gear teeth of the hub.

Additionally, either the lining carrier or over plate, or both, are preferably guided with respect to a guide diameter of the hub by means of a sliding or friction pairing, such as a plastic/metal friction pairing, for example.

As a result of the combination of a divided hub disc, which hub disc can be non-rotationally engaged by means of internal gear teeth without play in the circumferential direction in external gear teeth on the hub, and with the guidance of either the lining carrier or the cover plate, or both, by means of a sliding or friction pairing, such as a plastic/metal pairing, on a guide diameter of the hub, it is possible, on one hand, to manufacture the hub and the hub disc separately, and to employ a particularly favorable manufacturing process for each component. On the other hand, care is also taken that the components which can rotate relative to one another can be located and guided with precision with respect to one another, at least on one side of the hub. The lack of play in the gear teeth, however, can also result in a bearing with tolerances in which the two parts can still be Joined easily to one another.

In accordance with an additional characteristic of the present invention, it can be advantageous to locate the gear teeth in a radial area which lies between the radially inner areas of the apertures for the springs in the hub disc and the hub. In this manner, the largest part of the hub disc can be made simply from a sheet metal part, while on the hub, only the portion which has the external gear teeth projects radially outward, which means that there are typically no major problems in manufacturing the hub.

The present invention also teaches that a bearing ring, which can preferably be made of plastic, can be inserted in the lining carrier or cover plate, and can be attached to the guide diameter of a hub which is made of metal. Such a bearing ring is responsible for the essential meshing of the hub and lining carrier, which lining carrier can hold the friction linings essentially without play, which meshing can minimize the negative effects of unbalanced movements experienced during operation. A plastic bearing ring inserted at this point also makes it possible to have uniformly low friction at this point when relative rotation does occur, even with loads which are exerted in the radial direction, for example as a result of an offset of the axis of rotation of the crankshaft and transmission input shaft. At this point it should be noted that this bearing ring can naturally also be located on the cover plate, or the bearing rings can be located both on the lining carrier and on the cover plate. This last realization, however, can be rather rigid with regard to possible axial offset or a certain wobbling motion of the transmission input shaft, and is appropriate above all where the axial differences can be reduced to a minimum, e.g. by means of a pilot bearing.

An additional advantage of the invention is that, in accordance with at least one preferred embodiment, the bearing ring can have an essentially L-shaped cross section with a bearing body which is inserted concentrically into the opening of the lining carrier and/or cover plate and a flange which projects radially outward and is adjacent to the inside of the lining carrier or cover plate. Such a realization of the bearing ring can also make possible a very easy pre-assembly on the lining carrier or on the cover plate. In addition, the bearing ring can be supported on the hub or on the hub disc over a relatively large annular surface area, so that in this case favorable durability can be expected, e.g. in terms of wear.

The gear teeth between the hub disc and the hub can be oriented with respect to the bearing body and the bearing body flange so that the gear teeth are located between the inside and outside of the bearing body, including the flange. Such an arrangement can essentially guarantee, for example, that when there are inaccuracies in the manufacture of the gear teeth, there are still circumferentially uninterrupted ring-shaped surface areas of the bearing ring or contact both radially outside and radially inside these gear teeth.

The present invention also teaches that, on the side of the gear teeth opposite the bearing ring, if a bearing ring is provided only on one side, there can be a friction device with a spring which acts axially. This friction device with the spring which acts axially can essentially guarantee contact between the bearing ring and the hub and/or hub disc, and thus can also provide a certain amount of friction on the side of the bearing ring.

The friction device can advantageously also include friction ring, which friction ring can overlay the gear teeth in the radial direction. It is, of course, possible, without additional modifications, to provide a metal-on-metal friction device at this point, but in actual practice the flexibility offered by the use of a friction ring which is made of a different material has proven to be significantly more favorable.

The present invention also teaches that the width or material thickness of the hub and hub disc are coordinated with one another, at least in the vicinity of the gear teeth, so that preferably the hub disc has a smaller width, and there is come play in the axial direction between the bearing ring and the friction device with respect to the hub disc. Such a realization can make it possible to easily combine individual broad spectrum of possibilities. For example, if a single hub used, many different hub discs with different widths can be used, which can each be made thinner or thicker, as a function of the torque to which they are exposed.

On the other hand, it can naturally also be advantageous to realize the hub disc so that it is wider than the gear teeth of the hub, so that a clutch plate realized in this manner, in particular when the bearing ring is located on one side, can have a greater wobbling capability of the lining carriers or the cover plate with regard to the hub. This greater wobbling capability can be advantageous primarily when the transmission shaft is not aligned with the crankshaft.

It may be advantageous in the sense of the invention if the friction device is oriented so that it acts with respect to the hub disc radially outside the gear teeth of the hub. Such a configuration can then be advantageous if the clutch plate executes a certain wobbling motion as a result of not being aligned correctly with the transmission shaft, in which case the realization, in accordance with the present invention, can essentially guarantee that the friction device retains its unhindered friction action regardless of any potential offset between the hub disc and the hub.

The friction device thereby can include a least one friction ring on the hub disc, and a spring between the friction ring and the inner wall of the lining carrier or cover plate. However, it can also be possible, without further modifications, to provide a pressure ring between the spring and the friction ring, which can, for example, be guided non-rotationally but which can move axially in the cover plate or in he lining carrier. Such a friction device can essentially guarantee correct operation over its entire useful life.

The present invention also teaches that it can be advantageous to provide an additional friction ring in the vicinity of the external gear teeth of the hub, between the external gear teeth of the hub and the spring of the friction device. Thus, there can be two friction rings radially one on top of the other in the vicinity of the gear teeth, which friction rings can act independently of one another and can be pressurized both by independent springs and also by a common spring. This spring, on one hand, can be supported on the cover plate or on the lining carrier, and on the other hand, can have different flexible tabs which each act on the corresponding friction ring.

At this point, it should be noted that each friction device can also include only the bearing ring and a spring located opposite the bearing ring, e.g. an ondular or corrugated washer. Such a configuration can be particularly economical.

The present invention also teaches that the hub of the clutch disc can be made of plastic, and the lining carrier and/or cover plate can be provided with essentially cylindrical extensions which point away from the gear teeth, and are attached to corresponding guide diameters of the hub. Such a configuration can omit the bearing ring altogether, since the plastic/metal friction pairing is already present in the form of the material of the hub on the one hand, and the material of the sheet metal plates on the other hand. At the same time, the configuration of the lining carrier and cover plate with extensions which are attached to a guide diameter of the hub, and which extensions have a corresponding axial extension is particularly advantageous to the extent that these extensions can protect the hub, which can be made of plastic, against deformation radially outward, as a result of the torque which is transmitted to the internal gear teeth.

It can thereby be advantageous if the external gear teeth in the hub extend over only a portion of the axial extension, and the remaining portion acts as an axial stop for the hub disc. addition, on the side of the gear teeth opposite the remaining portion, there can be a friction device with a spring, which spring acts axially. Such an embodiment can be particularly simple to manufacture and can be created from a small number of individual parts. At the same time, any axial movement of the hub disc which may occur can be limited by the remaining portion of the hub.

The spring of the friction device, or a friction ring located between the spring and the external gear teeth, can thereby be advantageously designed so that the spring or the friction ring projects radially beyond the external gear teeth, where the spring or the friction ring can essentially guarantee the axial fixing of the hub disc.

The width of the hub disc should thereby be coordinated to the axial extension of the external gear teeth of the hub, so that the hub disc has some axial play. Thus, the hub disc can be self-adjusting within the range of its axial play. It is also possible, using the same hub, to use different hub discs with different thicknesses of material.

The present invention also teaches that the external gear teeth in the hub can extend only over a portion of the axial extension of the hub, and the remaining portion can act as an axial stop for the hub disc, and a friction device is located on the side of the external gear teeth opposite the remaining portion. Thus, on the side of the bearing ring opposite the remaining portion, there can be a continuous and uninterrupted contact surface, so that the relative rotation on which friction is exerted here can work with very little wear. The hub disc can thereby be made wider than the axial extent of the external gear teeth of the hub. Consequently, the hub disc is firmly clamped in the axial direction, so that the hub disc cannot execute any axial relative motion. This arrangement can have advantages with regard to particularly low unbalance in operation.

It can thereby be advantageous if the friction device includes a pressure ring, which pressure ring, on the side of the friction ring opposite the hub disc, can be in contact with the friction ring, and the spring is located between the pressure rings and the lining carrier or cover plate. It can thereby essentially be guaranteed that the friction ring can be protected from a one-sided load, which could occur in particular when a spring plate is used.

When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch assembly for a friction clutch for a motor vehicle, the friction clutch assembly comprising: a flywheel; a clutch housing; a hub; the hub defining an axis of rotation and an axial direction parallel to the axis of rotation; a clutch disc disposed within the clutch housing, the clutch disc coaxially surrounding the hub; pressure plate means disposed within the clutch housing and being movable in the axial direction, the pressure plate means for applying an axial force to the clutch disc along the axial direction; means for biasing the pressure plate means in the axial direction; the flywheel comprising a centrifugal mass; a centrifugal mass; the centrifugal mass being disposed substantially adjacent the clutch disc axially opposite the pressure plate means; the clutch disc being disposed between the pressure plate means and the flywheel; the clutch disc comprising friction lining means; the friction lining means being disposed substantially between the pressure plate means and the flywheel; a hub disc; the hub disc comprising an external portion and internal contour; the external portion being disposed further from the hub than the internal contour; the hub disc being disposed to coaxially surround the hub; the hub disc being disposed adjacent he flywheel; the hub having an internal portion and an external portion; the external portion comprising an external contour; the internal contour comprising means for meshing with the external contour; the external contour comprising means for meshing with the internal contour; both the meshing means having means for preventing substantial relative rotational movement between the hub and the hub disc upon engagement of the internal contour with the external contour; the internal contour of the hub disc being in mesh with the external contour of the hub.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
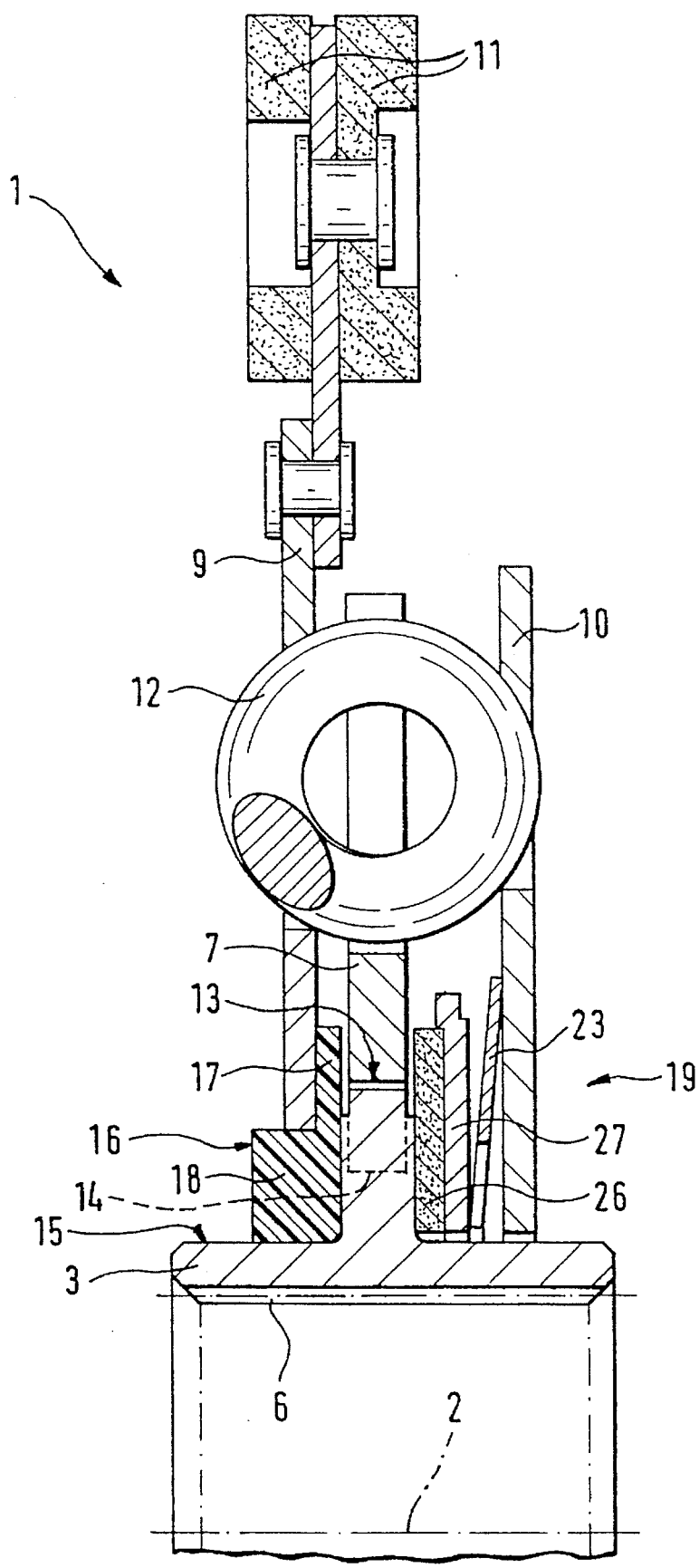
FIG. 1 shows a longitudinal section through the upper half of a clutch plate.

FIG. 1 shows the upper half of a longitudinal section through a clutch plate 1. The clutch plate 1 can include a hub 3, which hub 3 can be oriented concentrically with respect to an axis of rotation 2. The hub 3 can have internal gear teeth 6 for non-rotational attachment to external gear teeth on a transmission input shaft (not shown). The hub 3 can be provided in its axially central area with external gear teeth 13, which teeth 13 can project radially, and in which teeth 13 a hub disc 7 with corresponding internal gear teeth 14 can be engaged. The two sets of gear teeth 13, 14 can thereby be coordinated with one another so that they mesh with as little play as possible in the circumferential direction, but are still simple enough so that they can be manufactured in large series. On either side of the hub disc 7, there can be a lining carrier 9, and on the opposite side a cover plate 10, which lining carrier 9 and cover plate 10 can be non-rotationally connected to one another, and are held at a distance from one another. The lining carrier 9 is provided with friction linings 11 in its radially outer area. In both the hub disc 7 and the lining carrier 9 or cover plate 10, there can preferably be apertures which can locate springs 12. When torque is exerted on the friction linings 11, and this torque is transmitted via the hub 3 to the transmission shaft, such a damped relative rotation between the lining carrier 9 and the cover plate 10 or hub 3 can be executed to provide torsional damping.

The gear teeth 13, 14 between the hub 3 and the hub disc 7 can be located in the radial area between the hub 3 and the springs 12. In this area, there can also be a friction device 19, which friction device 19 dampens the relative rotation. The friction device 19, in this case, can include a friction ring 26 which corresponds to the gear teeth 13, 14, a pressure ring 27 and a spring 23, e.g. in the form of a spring plate, which spring 23 can be supported on one hand on the inner wall, e.g. of the cover plate 10, and on the other hand on the pressure ring The pressure ring 27 can, in turn, act via the friction ring 26, on the toothed area 13 of the hub 3 or the toothed area 14 of hub disc 7, or both.

On the side of the toothed area 13, 14 opposite the friction device 19, the lining carrier 9 can be mounted in the vicinity of its inside diameter on a bearing ring 16. The bearing ring 16 can be attached by means of its inside diameter to a guide diameter 15 of the hub 3. The bearing ring 16 can have a bearing body 18 and a flange 17, which flange 17 can preferably extend radially outward and can be adjacent to the inside of the lining carrier 9. By means of the spring 23 of the friction device 19, the lining carrier 9 can be brought into contact, by means of the bearing ring 16, with the toothed area 13, 14. In this case, the hub disc 7 with its internal gear teeth 14 can preferably be narrower than the hub 3. Both the flange 17 of the bearing ring 16 and the friction ring 26 can extend with their outside diameters beyond the toothed area 13, 14. Such an embodiment can make it possible, for example, to combine a standard hub 3 with hub discs 7 of different thicknesses, and thus to manufacture a series of clutch plates using a relatively small number of individual parts. The friction action of the friction device 19 and of the bearing ring 16 can thus be exerted essentially only on the external gear teeth 13 of the hub 3. The bearing ring 16 can essentially guarantee a correct correspondence between the parts which rotate relative to one another and a uniform friction action, in particular with respect to the guide diameter 15 of the hub 3. It can thereby be possible, without further modification, to locate the bearing ring 16, for example, on the side of the cover plate 10, or to provide both the lining carrier 9 and the cover plate 10 each with a separate bearing ring.

Figure 1A:
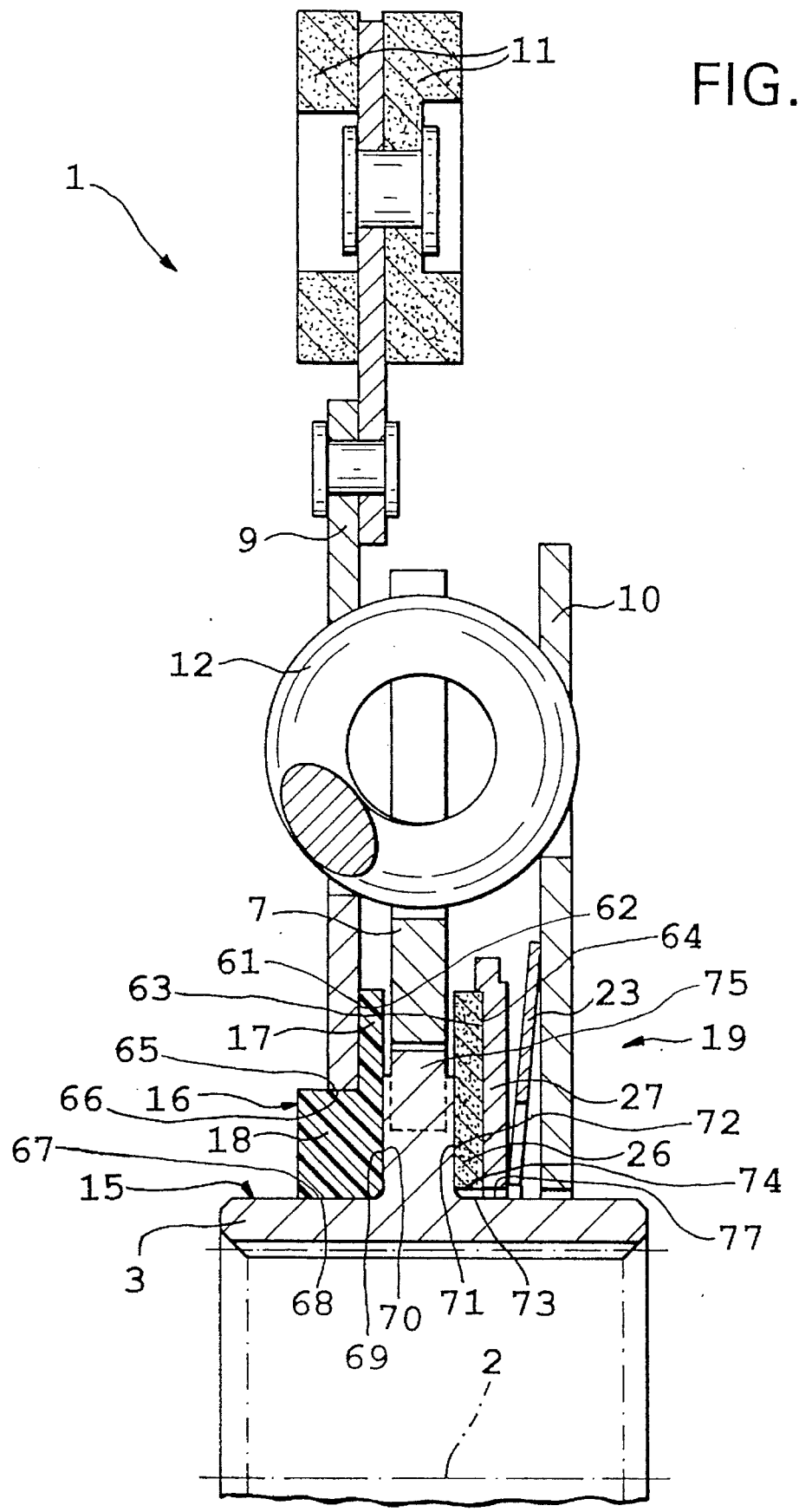
FIG. 1a is essentially the same as FIG. 1, but is more detailed.

In accordance with an embodiment of the present invention, as shown in FIG. 1a, an inside radial surface 61 of the lining carrier 9 can be attached to an outside radial surface 62 of the bearing ring flange 17 of the bearing ring 16. Additionally, an inside axial surface 65 of the lining carrier 9 can be attached to an outside axial surface 66 of the bearing ring body 18 of the bearing ring 16. In accordance with this embodiment, movement can be permitted between an inside radial surface 69 of the bearing ring 16 and an outside radial surface 70 of a radial extension 75 of the hub 3. Also, movement can be permitted between an inside axial surface 67 of the bearing ring body 18 of the bearing ring 16, and an outside axial surface 68 of the hub 3. Attaching adjacent surfaces one to another of the lining carrier 9 and the bearing ring 16, can essentially assure that there will be little or no movement between the lining carrier 9 and the bearing ring 16. Under certain conditions this arrangement can be advantageous.

In accordance with another embodiment of the present invention as shown in FIG. 1a, the outside radial surface 62 of the bearing ring flange 17 of the bearing ring 16 can be permitted to move in relation to the inside radial surface 61 of the lining carrier 9. Accordingly, the inside axial surface 65 of the lining carrier 9 can also be permitted to move in relation to the adjacent outside axial surface 66 of the bearing ring body 18 of the bearing ring 16. Further, the inside axial surface 67 of the bearing ring body 18 of the bearing ring 16 can be attached to the outer axial surface 68 of the hub 3. Consequentially, the outside radial surface 70 of the radial extension 75 of the hub 3 can be attached to the inside radial surface 69 of the bearing ring 16.

In accordance with yet an additional embodiment of the present invention, movement can be permitted between the outside radial surface 62 of the bearing ring flange 17 of the bearing ring 16, and the adjacent inside radial surface 61 of the lining carrier 9. Movement can also be permitted between the inside axial surface 65 of the lining carrier 9 and the corresponding outside axial surface 66 of the bearing ring body 18 of the bearing ring 16. In accordance with this embodiment, movement can also be permitted between the outside radial surface 70 of the radial extension 75 of the hub 3 and the inside radial surface 69 of the bearing ring 16. Further, the outside axial surface 68 of the hub 3 can be permitted to move in relation to the inside axial surface 67 of the bearing ring body 18 of the bearing ring 16. The result would then be what may be described as a "floating" bearing ring, being that the bearing ring would essentially not be fixedly attached to any adjacent surfaces. On one hand, allowing for movement between all of the surfaces described above may be necessary depending on the particular application of the particular embodiment, and on the other hand, may not be necessary but nevertheless may be desirable.

In accordance with another embodiment of the present invention, as shown in FIG. 1a, an outside radial surface 63 of the friction ring 26 can be attached to an inside radial surface 64 of the pressure ring 27. In this variation, movement can be permitted between an outside radial surface 71 of the radial extension 75 of the hub 3, and the adjacent inside radial surface 72 of the friction ring 26. Accordingly, an outside axial surface 73 of the hub 3 can preferably not be attached to the inside axial surface of the friction ring 26. Also, in this variation, the outside axial surface 73 of the hub 3 would not be attached to the adjacent inside axial surface 77 of the pressure ring 27.

In an additional variation of the embodiment of the invention as shown in FIG. 1a, movement can preferably be permitted between the inside radial surface 64 of the pressure ring 27 and the outside radial surface 63 of the friction ring 26. Thus, in this variation, an inside radial surface 72 of the friction ring 26 can be attached to the adjacent outside radial surface 71 of the radial extension 75 of the hub 3. In this variation, the inside axial surface 74 of the friction ring 26 is attached to the outside axial surface 73 of the hub 3. The inside axial surface 74 of the pressure ring 27 can also be attached to the outside axial surface 73 of the hub 3.

Additionally, in accordance with one embodiment, the inside radial surface 64 of the pressure ring 27 can preferably be unattached to the outside radial surface 63 of the friction ring 26. The inside radial surface 72 of the friction ring 26 also could be unattached to the outside radial surface 71 of the radial extension 75 of the hub 3. The inside axial surface 74 of the friction ring 26 can preferably be attached to the outside axial surface 73 of the hub 3, as necessary. In addition, the inside axial surface 77 of the pressure ring 27 could be attached to the outside axial surface 73 of the hub 3 as indicated by necessity of the application of the embodiment.

The attachments described hereabove can be made permanent in accordance with certain applications. The attachments as described can also be made in such a way, e.g. by means of soluble adhesives, and other means, so that individual parts can be replaced or allowed additional movement, again according to the application of the particular embodiment of the present invention. In any case, the variations of the embodiment of the invention can have various advantages according to the combination of attached and unattached parts, permanent or removable means of attachment, and the circumstances of application of the embodiment.

Figure 2:
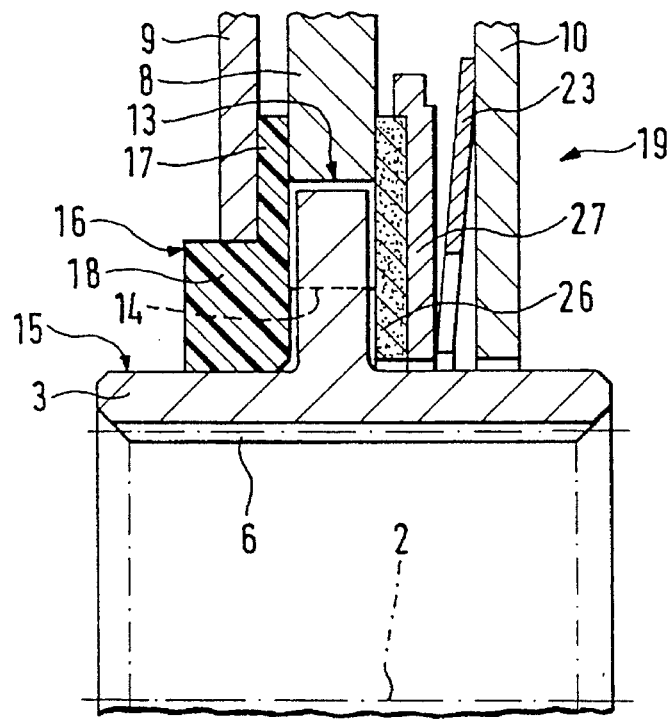
FIG. 2 a detail of a longitudinal section of a variant embodiment.

FIG. 2 shows a detail of a variant of the embodiment illustrated in FIG. 1 and 1a. The basic difference between the embodiments is that in FIG. 2, the axial thickness of the hub disc 8 is greater than the axial thickness of the hub 3, in the vicinity of the external gear teeth 13 of hub 3. As a result, both the bearing ring 16 with its flange 17 and the friction ring 26 can be in contact laterally with the hub disc 8, and there can be a certain amount of play between the bearing ring 16 and the friction ring 26 and the external gear teeth 13 of the hub 3. When there is a bearing ring 16, for example on the side of the lining carrier 9, it can be possible that the clutch disc is able, to a certain extent, to execute wobbling movements which can be the result of the fact that the axis of rotation 2 of the hub 3 wobbles because the transmission shaft is not aligned with the crankshaft, while the friction linings 11 (not shown here, but see FIGS. 1 and 1a) and the lining carrier 9 and cover plate 10 are clamped in the clutch.

With such loads acting on the clutch plate from outside, it can be, in any case, advantageous to equip essentially only the lining carrier 9 or the cover plate 10 with a bearing ring 16. It should be noted that if only one bearing ring 16 is used, it should be placed opposite the friction device 19.

In accordance with one embodiment of the present invention, the play may be a clearance between the bearing ring 16 with its flange 17, and the fraction rang 26. On one hand, this play may be necessary according to the circumstances of the application of the embodiment, and on the other hand, may not be necessary but nonetheless desirable.

The amount of play the hub 3 in the embodiment shown in FIG. 2 can possibly result from the very slightest movement, even possibly of a vibrational-type to a wobble-type movement involving any and all axial space available due to the difference in sizes of the greater axial width of the hub disc 8 in the vicinity of its internal gear teeth 14, and the smaller axial width of the hub 3 in the vicinity of the external gear teeth 13 of the hub 3.

Figure 3:
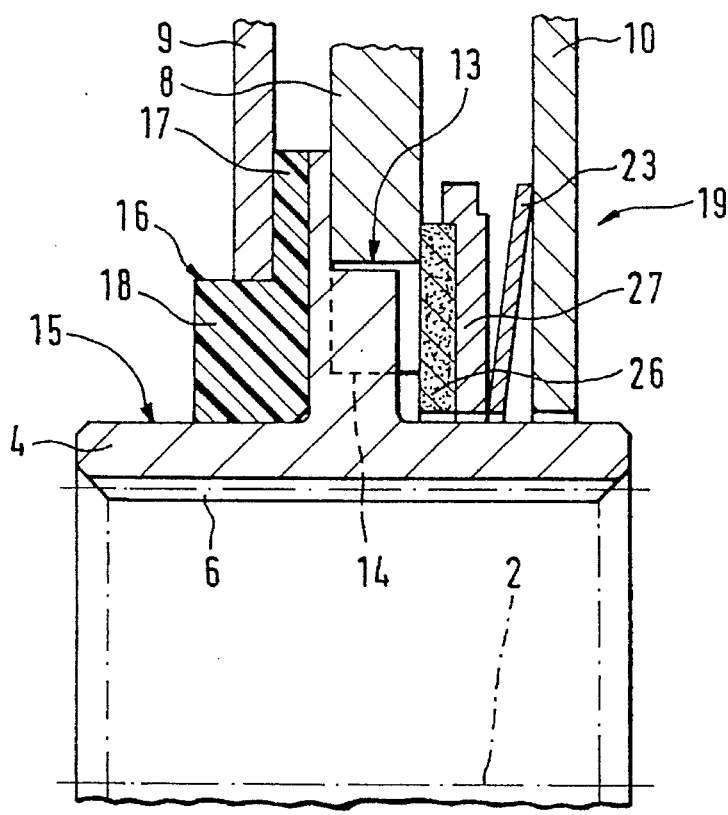
FIG. 3 shows a detail of a longitudinal section of an additional variant.

FIG. 3 illustrates a variant of the embodiment illustrated in FIG. 2, in which the hub 4 in FIG. 3 has a different design in the vicinity of its external gear teeth 13. The external gear teeth 13 can preferably be machined into the hub 4 essentially only over a partial axial area of the toothed area, and there can be a remaining portion without gear teeth on the side facing the bearing ring 16. The portion without gear teeth can project beyond the external contour of the gear teeth 13 in the radial direction, and can have approximately the same diameter as the flange 17 of the bearing ring 16. The hub disc 8 can be engaged by means of its internal gear teeth 14 in the external gear teeth 13 of the hub 4, and the hub disc 8 is provided with a material thickness in the axial direction such that it projects beyond the external gear teeth 13 toward the cover plate 10. As a result of this design, the friction ring 26 can be pressed by the force of the spring 23 against the internal gear teeth 14 of the hub disc 8, and keeps the friction ring 26 in contact with the enlarged diameter area of the hub 4 in an axial clamping action. The path of the transmission of force, starting from the spring 23, can thus run via the cover plate 10, the retaining means located between the cover plate 10 and lining carrier 9, the lining carrier 9, the flange 17 of the bearing ring 16, the hub 4, the hub disc 8, the friction ring 26 and the pressure ring 27. In accordance with one embodiment, the retaining means located between the cover plate 10 and the lining carrier 9 can be in the form of spacer bolts, which spacer bolts can be used to connect the cover plate 10 and the lining carrier 9 to one another in a spaced-apart relationship. Such spacer bolts are well known and will therefore not be discussed further here. The axial friction clamping of the hub disc 8 can result in a very self-contained clutch plate, which shows no tendency toward significant imbalance during operation due to the fact that the clutch plate can be held in place relatively firmly.

Figure 4:
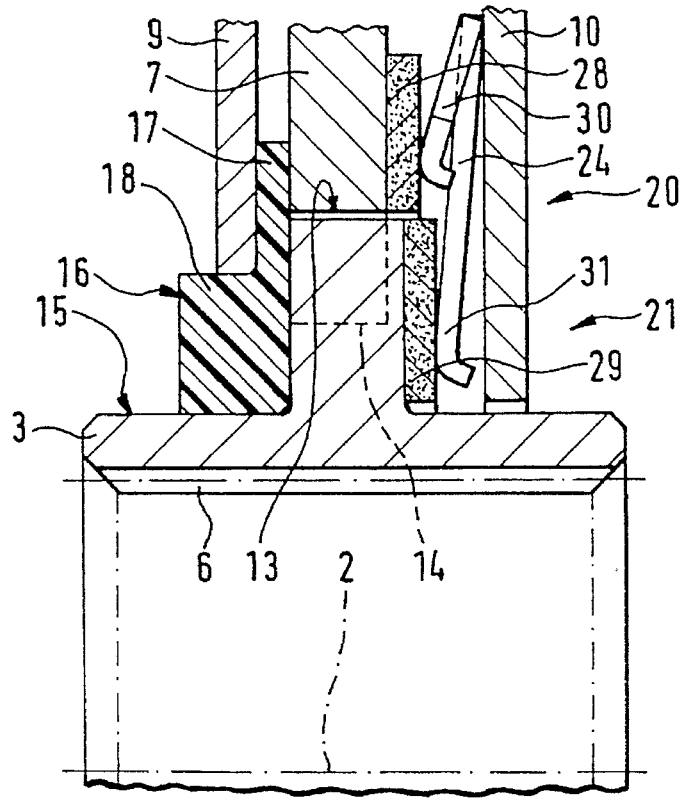
FIG. 4 shows a detail of a longitudinal section with two friction rings located one above the other.

FIG. 4 illustrates an additional variant in which the hub disc 7 can preferably be narrower than the hub 3 in the vicinity of the external gear teeth 13 of hub 3. The lining carrier 9, in its radially inside diameter, can be equipped with the bearing ring 16 which has the radially-projecting flange 17. There can also be a friction ring 29 on the opposite side, between the cover plate 10 and the external gear teeth 13 of the hub 3, and a friction ring 28 located radially outside the external gear teeth 13, opposite the hub disc 7. The friction ring 29 can be located directly adjacent to the hub 3, and the friction ring 28 can be located directly adjacent to the hub disc 7.

In connection with a spring 24, there can be a friction device 21 and a friction device 20, radially one above the other. The spring 24 can thereby be e combination component, as illustrated, with separate flexible tabs 30, which tabs 30 can act on the friction ring 28. The spring 24 can also have separate flexible tabs 31, which tabs 31 can act on the friction ring 29. However, it can also be possible to provide a separate spring for each of the two friction rings 28, 29. As a result of the arrangement of two friction rings 28, 29 located radially one above the other, the friction devices 20 and 21 32 an each adjusted independently of one another, as a function of the intended use of the clutch plate. It can also be possible to use hub discs which have different axial thicknesses. The clamping of the hub disc 7 with essentially no axial play can result in a clutch plate which is essentially not sensitive to imbalance in operation.

Figure 5:
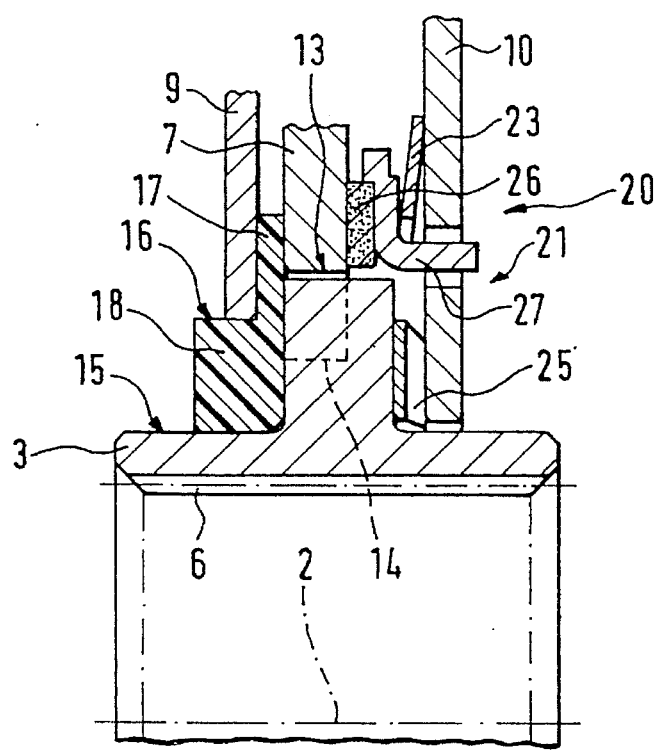
FIG. 5 shows a detail of a longitudinal section of an additional variant.

FIG. 5 illustrates a variant of FIG. 4, whereby in this embodiment, the friction device between the cover plate 10 and the external gear teeth 13 of the hub 3 is represented by a relatively simple ondular or corrugated washer 25. As a result, the friction device 21, including the bearing ring 16 of the lining carrier 9, can be realized with only a few individual parts. In this case, the friction device 20 lying radially above friction device 21 can include a spring 23, a pressure ring 27 and a friction ring 26,32 which friction ring 26 can be located adjacent to the hub disc 7. The pressure ring 27, in accordance with this embodiment, is non-rotational but can preferably move axially with respect to the cover plate 10, because axially-bent lugs on the pressure ring 27 are engaged without play in the circumferential direction in corresponding openings of the cover plate 10. The friction device 20 can thus be particularly reliable and durable. With regard to its sensitivity to unbalanced conditions, the embodiment in FIG. 5 can have approximately the same characteristics as the embodiment illustrated in FIG. 4.

Figure 6:
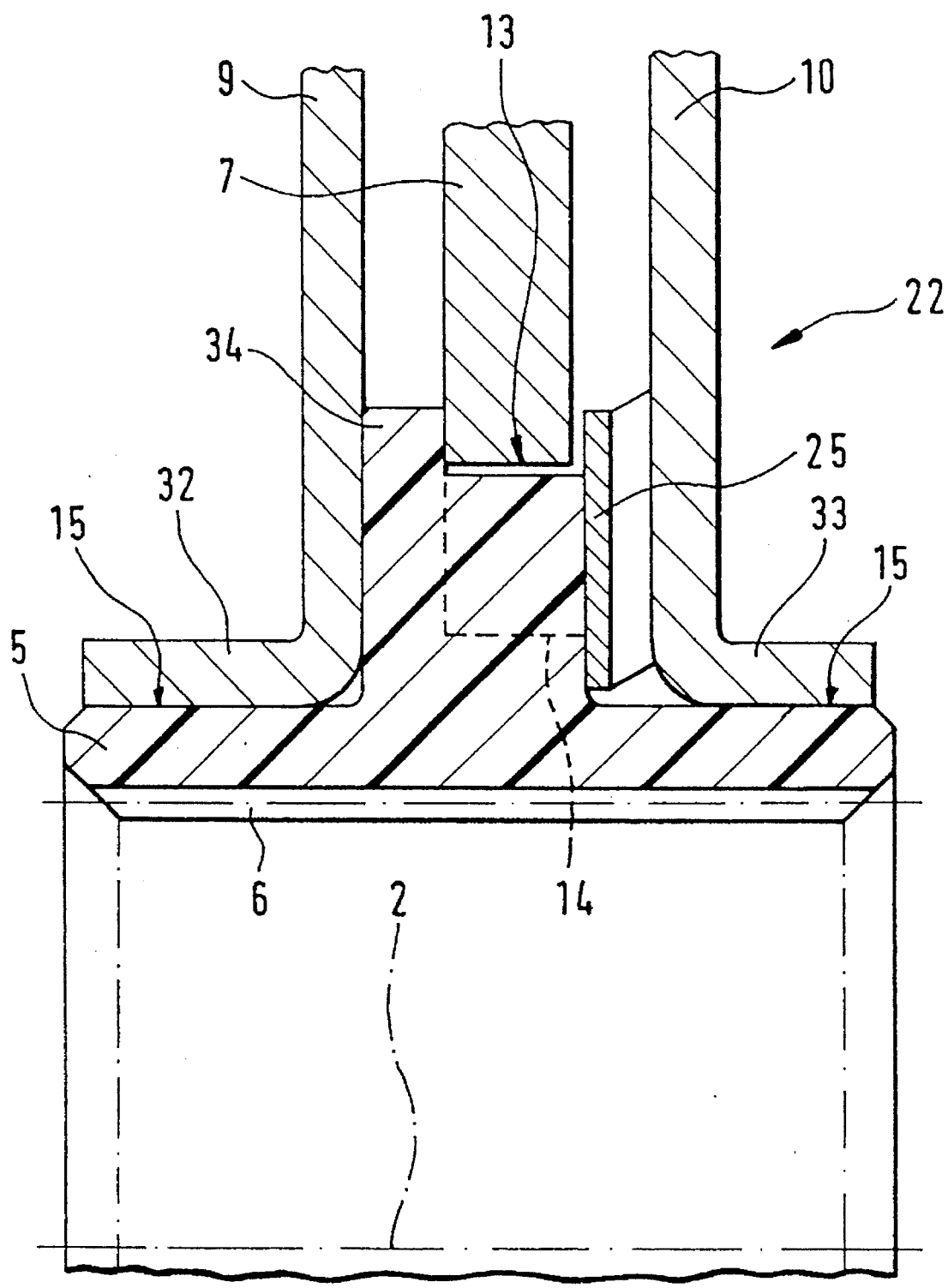
FIG. 6 shows a detail of a longitudinal section of an embodiment with a plastic hub.

The variant of a clutch plate illustrated in FIG. 6 differs significantly from the clutch plates illustrated in FIGS. 1–5. In FIG. 6, the hub 5 can preferably be made of a plastic material, and the use of bearing rings is essentially unnecessary. At least the lining carrier 9, and possibly also the cover plate 10, can be provided in their respective radially inner areas with extensions 32 and 33. The extensions 32, 33 can preferably extend axially away from the toothed portion 13 of the hub 5, and can be attached to corresponding guide diameters 15 of the hub 5. These extensions 32, 33 can thereby extend essentially over a distance which is approximately equal to essentially the entire axial extension of the hub 5. Thus, the hub 5 with its plastic material in the axial direction,can be protected by these extensions 32, 33 against radial expansion, splitting, breakup or other deformation, which might be caused by the transmission of torque via the internal gear teeth 6 of the hub 5. At the same time, the parts 9 and 10 can preferably be made of sheet metal, and along with their extensions 32, 33, can represent a material pair with favorable friction characteristics with respect to the hub 5, which hub 5 can be made of plastic. The hub 5, in the toothed area 13, can be provided with an axial stop 34 which axial stop 34 can have a larger diameter than the external gear teeth 13. The hub disc 7 can be held in position by the axial stop 34 in the direction of lining carrier 9. In the other direction, an ondular or corrugated washer 25 can be located between the cover plate 10 and the hub 5, and can be used to generate the friction force. The outside diameter of washer 25 can extend beyond the outside diameter of the external gear teeth 13, and can form another axial stop for the hub disc 7. As a result of the axial play provided for the hub disc 7, it can be possible to manufacture clutch plates using a modular system. Hub discs 7 of different thicknesses can thus be combined with the same hub 5, depending on the application and the load to which the clutch plate will typically be subjected.

In the embodiments illustrated in FIGS. 1, 1a, and 6, it can naturally also be possible to reduce the axial play of the hub disc 7 by means of a spring 23 or washer 25, in respect to FIG. 1, 1a, and 6, which spring 23 or washer 25 can act axially. The axial correspondence between the hub disc 7 and the hub 3 or 5, respectively, can thereby be defined. The fords exerted by these springs should be lower than the force provided for the friction device 19 (FIGS. 1 and 1a) or friction deride 22 (FIG. 6). The effectiveness of the friction devices 19 or 22 can thereby not be adversely affected.

The corresponding inner/outer contours of the hubs and hub discs, and possibly any other parts involved in any interplay, can also have other geometric shapes, such as a polygonal shape, for example.

With FIG. 7, the disclosure now turns to an example of a more complete clutch assembly than that shown in the figures discussed hereinabove. It should be understood that the components shown in FIG. 7 can be considered to be interchangeable with similar components discussed hereinabove; for example, the clutch plate 8' shown in FIG. 7 could be considered to he interchangeable with the clutch plate 1 of the present invention. It should also be understood that components discussed herebelow with relation to FIGS. 8 through 10 may, if appropriate, be considered to be interchangeable with similar components discussed hereabove with relation to FIGS. 1 through 6.

Figure 7:
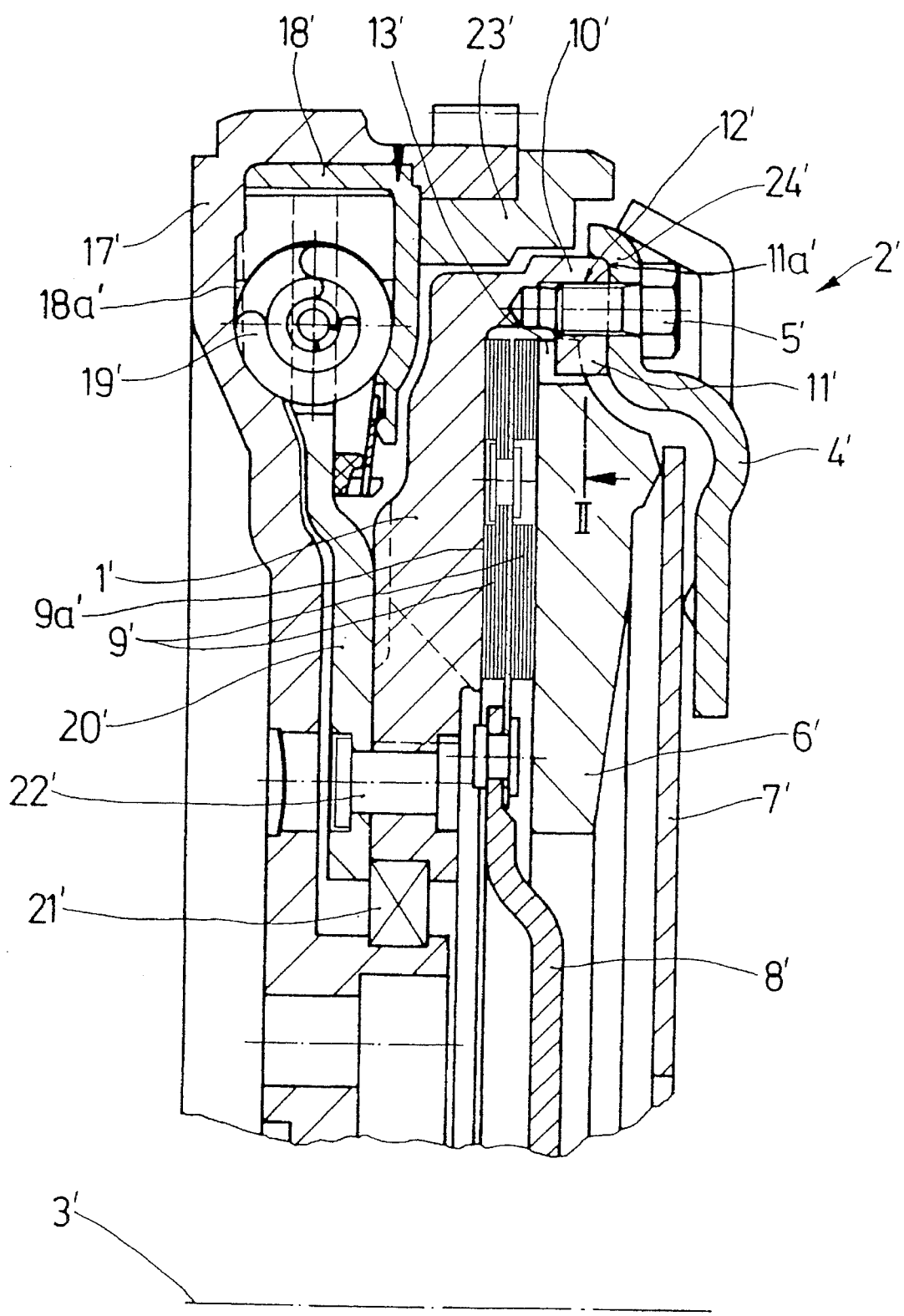
FIG. 7 shows the upper half of a longitudinal section of a flywheel assembly.
Figure 10:
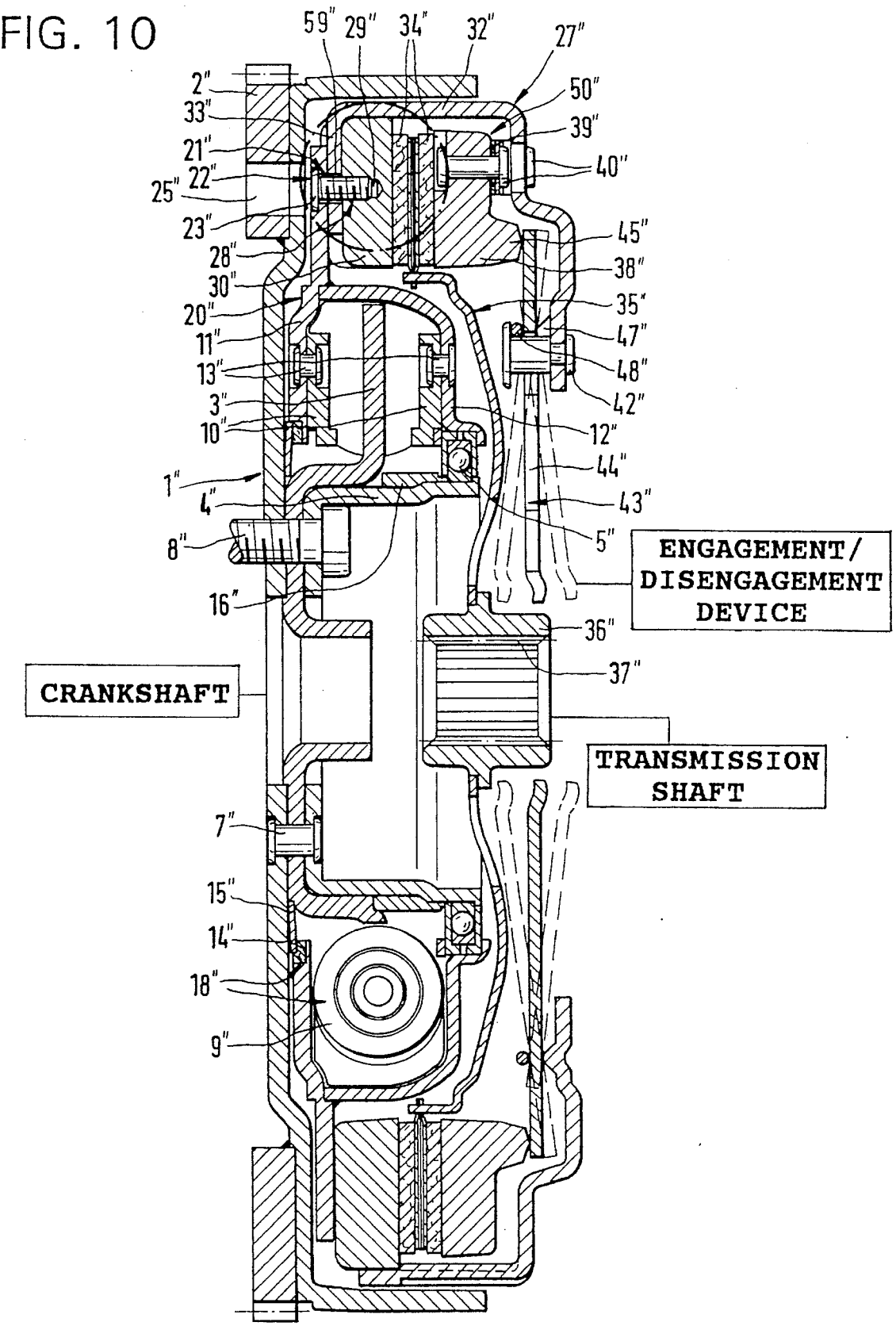
FIG. 10 shows a flywheel device in halves in partial longitudinal section.

FIG. 7 shows a flywheel, preferably with two centrifugal masses, on which flywheel a primary centrifugal mass 17' can preferably be bolted directly to the crankshaft (not shown) of an internal combustion engine (See FIG. 10). The primary centrifugal mass 17' can preferably be disposed concentrically with respect to an axis of rotation 3'. The primary centrifugal mass 17' can preferably include a cover 18', rigidly connected to the primary centrifugal mass 17'. The primary centrifugal mass 17' and the cover 18' can thus form a torus-like chamber 18a' preferably concentric to the axis of rotation 3', in which chamber 18a' several coil springs 19' can be disposed. A hub disc 20' can extend into the torus-like space 18a', preferably in the radial direction, whereby the coil springs 19' can preferably be activated both by the hub disc 20', and by the primary centrifugal mass 17' and the cover 18'. The hub disc 20' can preferably be rigidly connected with a flywheel 1', preferably in the radially inner portion of the hub disc 20', by means of rivets 22'. Flywheel 1' is preferably part of a secondary centrifugal mass. The flywheel 1' can be supported in relation to the primary centrifugal mass 17' preferably by means of a bearing 21', but the flywheel 1' is preferably mounted so that it can rotate in relation to the primary centrifugal mass 17', preferably against the force of the coil springs 19'.

On the flywheel 1', preferably in the radially outer portion of the flywheel 1', there can be an axially-extending concentric wall 10'. The concentric wall 10' can surround a friction lining 9' of a clutch disc 8', preferably with a slight radial clearance. There can be a number of lugs 11' preferably disposed at an axial distance from a friction surface 9a' between the friction lining 9' and the flywheel 1'. The lugs 11' can preferably be distributed over the circumference of the concentric wall 10' and point radially inward. Threads 12' for threaded fasteners 5' can preferably be located in the vicinity of the lugs 11'.

A pressure plate 2' for engaging the clutch disc 8' with the flywheel 1' can preferably be releasably fastened to the flywheel 1' by means of the threaded fasteners 5'. Located adjacent to the pressure plate 2', there can preferably be a clutch housings 4'. The clutch housing 4' can be equipped with a flange 24', which flange 24' can extend radially outward, and which flange 24' can be in contact with a corresponding radial surface 11a' of the flywheel 1'. The radial surface 11a' of the flywheel 1' can preferably be formed by the concentric wall 10' and by the lugs 11'. The pressure plate 2' preferably also has a thrust plate 6'. The thrust plate 6' is preferably connected so that it is essentially torsionally stationary but can move axially, preferably with the clutch housing 4'. The thrust plate 6' can then be pressurized by a membrane spring 7', which membrane spring 7' can preferably be braced both on the thrust plate 6' and also on the clutch housing 4'.

Figure 8:
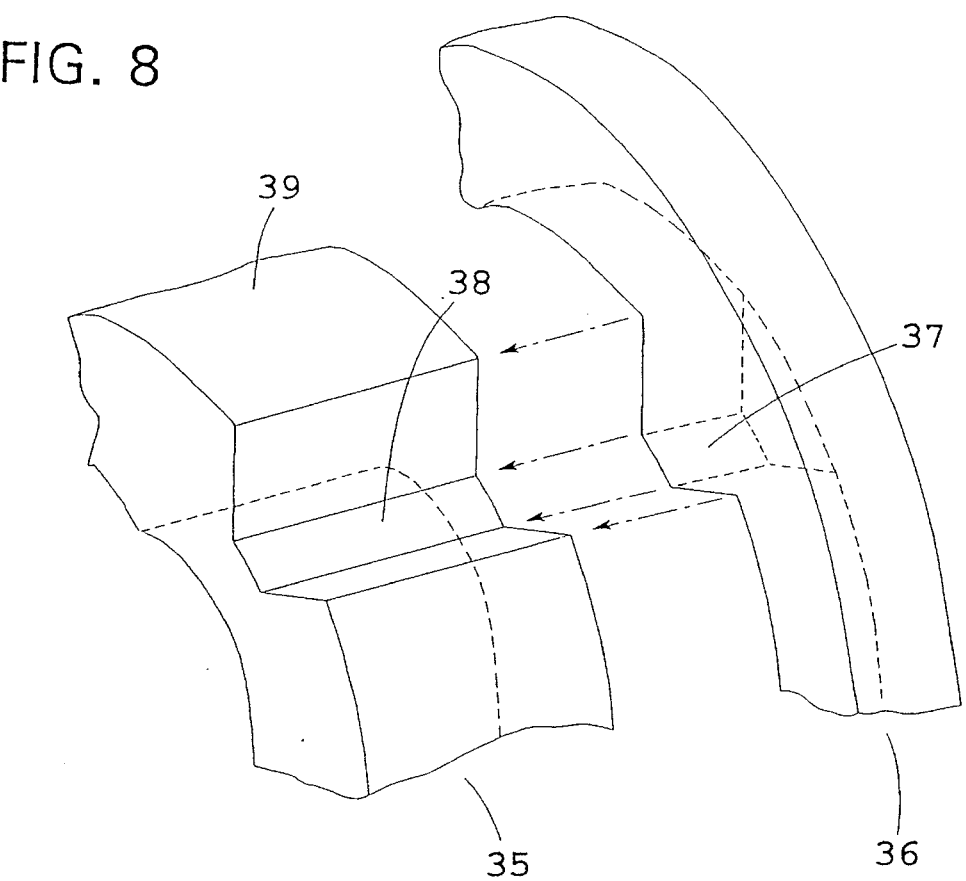
FIG. 8 shows a partial exploded view of a hub and hub disc.

FIG. 8 shows an-exploded view, in partial section, of a preferable engagement, or interlocking of a hub 35 and a hub disc 36. It should be understood that any components discussed with regard to FIG. 8 may be considered to be interchangeable with similar components discussed hereinabove with regard to FIGS. 1–6. As illustrated in FIG. 8, tooth space 38 is preferably located between and defined by two adjacent external teeth 39 of the hub 35. Internal teeth 37 of the hub disc 36 can preferably interlock with the tooth spaces 38 located between and defined by two adjacent external teeth 39 of the hub 35.

Figure 9:
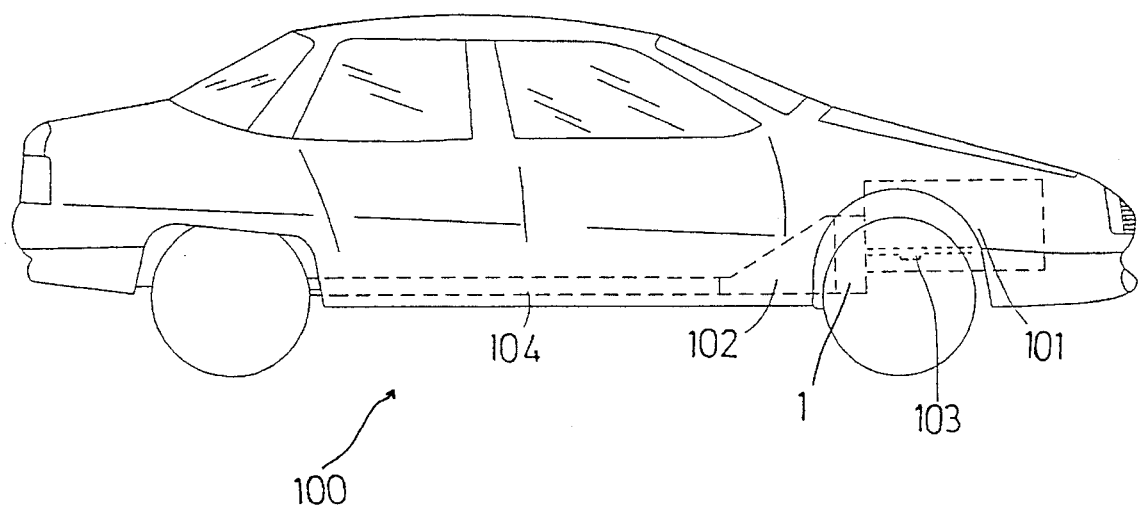
FIG. 9 depicts the general components of a motor vehicle power train.

FIG. 9 shows what could be considered to be a typical automobile 100, which automobile 100 can include an internal combustion engine 101, which can be mounted in a forward portion of the automobile 100. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via drive shaft 104. If the automobile has a manual transmission 102, the clutch plate 1 in accordance with the present invention may also be included for engaging the transmission 102 with the engine 101.

FIG. 10 shows another embodiment of a clutch assembly. It should be understood that the components discussed here below may be considered to be interchangeable with similar components discussed above. The flywheel apparatus illustrated in FIG. 10 includes a first centrifugal mass 1". In the radially outer area, the first centrifugal mass 1" can support a starter rim 2". The radially inner area of the centrifugal mass 1" can be provided with passages which can preferably be aligned with similar passages in a hub disc 3" and a sleeve 4". The free end of sleeve 4" can preferably support a bearing element 5". The centrifugal mass 1", the hub disc 3" and the sleeve 4" can be firmly connected to one another by rivets 7" which can penetrate some of the passages, and also by screws 8" which can penetrate some of the passages. The centrifugal mass 1", the hub disc 3" and the sleeve 4" can be connected to a driving mechanism, e.g. the crankshaft shown schematically in FIG. 10 of an internal combustion engine.

In accordance with an embodiment of the present invention, for the purpose of fastening the rivets 7" and the screws 8", there are preferably openings in the clutch plate 35". The openings in the clutch plate 35" can preferably be located axially adjacent the area where the rivet 7" or the screw 8" can essentially be inserted to fasten the first centrifugal mass 1", the hub disc 3" and the sleeve 4" together. By inserting a tool through the opening in the clutch plate 35", the head of the rivet 7" or of the screw 8" can then be tightened.

The hub disc 3" can preferably be engaged in the radially outer area with spring elements 9", to which spring elements 9" pressure can also be applied by projections 10". The projections 10" can preferably be fastened to cover plates 11" and 12" by rivets 13". The cover plates 11", 12" can preferably be firmly connected to one another radially outside the hub disc 3" by welding. On its radially inner end, the cover plate 11" is preferably engaged with a basic friction device 14", which friction device 14" can interact in the manner which is well-known in the art with regard to an application spring 15", and the cover plate 12", on its radially inner end, in interaction with the corresponding projection 10", can axially secure the bearing element 5", the inner bearing ring of which bearing element 5" is in turn supported on the hub disc 3" by a bushing 16". The spring elements 9", like the basic friction device 14", can preferably be part of a torsional vibration damper 18". The torsional vibration damper 18" is preferably enclosed by the cover plates 11" and 12" and can preferably be filled with viscous medium to damp movements of the spring elements 9".

The cover plates 11" and 12" preferably move relative to the hub disc 3". The cover plates 11", 12" are preferably active as the second centrifugal mass 20" of the flywheel apparatus. The cover plate 11" preferably projects in the radial direction beyond the point where the cover plate 11" is welded to the cover plate 12" radially outward. Close inside the outer end of the cover plate 11", there can preferably be a recess 21", which recess 21" essentially permits the insertion of a fastening means 22", e.g. a screw 23". Aligned with the recess 21", there can preferably be openings 25" in the first centrifugal mass 1". Also preferably aligned with the recess 21", there can be a passage 59" in a clutch housing 27" and a depression 28", e.g. in the form of a blind hole 29", that can be located in a counterpressure plate 30". If a screw 23" is to be inserted as the fastening element 22", as illustrated in FIG. 10, the depression 28" can preferably be cylindrical and can be provided with a thread.

Therefore, in accordance with a preferred embodiment of the present invention, the cover plates 11", 12" can be designed to move with respect to the hub disc 3". In addition, the cover plates 11", 12" can be designed to essentially act as the second centrifugal mass 20". For the purpose of operatively connecting the cover plates 11", 12" to the the counterpressure plate 30", the cover plate can preferably extend radially outward beyond the point where the cover plate 11" is welded to cover plate 12". For the purpose of fastening the cover plate 11" to the counterpressure plate 30", the recesses 21" in the radially extended portion of the cover plate 11" can preferably be aligned with passages 59" in the clutch housing 27" and with the depressions 28" of the counterpressure plate 30". The recesses 21" can also preferably be aligned with the openings 25" of the first centrifugal mass 1". When the recesses 21", depressions 28", and the openings 25" are essentially in alignment with one another, the fastening elements 22" can then be inserted therethrough thereby fastening the cover plate 11" with respect to the counterpressure plate 30".

The clutch housing 27" preferably has a ring-shaped wall 32", which ring-shaped wall 32" preferably surrounds the counterpressure plate 30". On the side facing the centrifugal masses 1" and 20", the wall 32" can preferably have an extension 33", which extension 33" can preferably be bent radially inward. The above-mentioned passage 59" for the respective fastening element 22" is preferably provided in the extension 33".

The counterpressure plate 30" can be placed in contact with a friction lining 34" of a clutch plate 35", which clutch plate 3" is preferably located non-rotationally on a hub 36". The hub 36" is preferably designed so that it has gear teeth 37" along its inside diameter. As a result of gear teeth 37", the clutch disc 35" can be non-rotationally connected to a transmission shaft (shown schematically in FIG. 10). On its side facing away from the counterpressure plate 30", the clutch plate 35" can be placed in contact with an application plate 38" by an additional friction lining 34". This application plate 38", however, is preferably connected non-rotationally to the clutch housing 27" by an elastic element 39", e.g. transverse leaf springs, but so that it can still move axially.

In accordance with an embodiment of the present invention, the application plate 38" can preferably be non-rotationally connected to the clutch housing 27". The elastic elements 39" can preferably be fastened between the clutch housing 27" and the application plate 38" by rivets 40". The elastic elements 39" can thereby essentially permit the application plate 38" to move in an axial direction with respect to the clutch housing 27". A portion of the clutch housing 27" can preferably be connected to a portion of the application element 43", the free end of which application element 43" can preferably be located adjacent the application plate 38". The application element 43" can thereby apply a force to the application plate 38". Since the elastic elements 39" essentially permit an axial movement of the application plate 38" with respect to the clutch housing 27", the application plate 38" will also essentially move axially with respect to friction lining 34". The elastic elements 39" can permit the application plate 38" to move axially toward and in contact with friction lining 34". Similarly, the elastic elements 39" can permit the application plate 38" to move in an axial direction away from friction lining 34".

Radially farther inside on the clutch housing 27", there can preferably be bearing necks 42" for supporting an application element 43", such as a membrane spring 44". The application element 43" can be brought into contact in the radially outer area with a lug 45" of the application plate 38". The radially inner area of the application element 43" can be in contact with a release lever or clutch disengagement device (shown schematically in FIG. 10). On one hand, the application element 43" can be held in position by tips 47" preferably formed on the clutch housing 27". On the other hand, the application element can be held in position by a bearing ring 48". Together with the counterpressure plate 30", a pre-assembled unit 50" can be formed by the clutch housing 27", which clutch housing 27" can preferably have the application element 43", the application plate 38" and the clutch plate 35".

Therefore, in accordance with an embodiment of the present invention, the pre-assembled unit 50" can preferably include the counterpressure plate 30" and the clutch housing 27", which clutch housing 27' can include the application element 43", the application plate 38", and the clutch plate 35".

After the flywheel apparatus has been in operation for an extended period of time, the thickness of the friction linings 34" on the clutch plate 35" may be significantly reduced by wear. In addition, both the application plate 38" and the counterpressure plate 30" can each have traces of wear on their sides facing the friction lining 34". When the above-mentioned elements 30", 35" and 38" should be replaced due to wear, the pre-assembled unit 50" is preferably removed from the second centrifugal mass 20". The pre-assembled unit 50" can essentially be removed from the second centrifugal mass 20" by removing the fastening elements 22" from the flywheel apparatus. If screws 23" are used as the fastening elements 22", the pre-assembled unit 50" can be removed by loosening the screws 23". Then, the clutch housing 27" can be removed, without having to remove the centrifugal masses 1" and 20" and the torsional vibration damper 18" along with the clutch housing 27". Since the application element 43" is preferably held by the bearing neck 42", and the application plate 38" is preferably held by the elastic element 39" on the clutch housing 27", and the counterpressure plate 30" can be held by the clutch housing 27" both in the radial and in the axial direction, these elements, like the clutch plate 35" clamped between them, will be essentially carried along when the clutch housing 27" is removed.

Therefore, in accordance with an embodiment of the present invention, since the clutch housing 27" can preferably be connected with the application element 43", the application plate 38", the counterpressure plate 30", and the friction linings 34", all these elements can essentially be removed together when the components need to be replaced due to wear. It is a particularly advantageous feature of the present invention that the clutch housing 27" can be removed for replacement without having to remove or replace the centrifugal masses 1", 20".

Essentially just as easily, another clutch housing 27" equipped with new wear elements can be inserted. The new clutch housing 27" can be re-attached to the corresponding centrifugal mass 20" essentially simply by inserting the fastening elements 22".

One feature of the invention resides broadly in the clutch plate for a friction clutch, comprising a clutch with internal gear teeth for non-rotational attachment to a transmission input shaft which defines an axis of rotation, a hub disc which is non-rotationally connected to the hub, sheet metal parts in the form of a lining carrier plate and a cover plate located one on either side of the hub disc, which are non-rotationally connected to one another and are held at a distance from one another, friction linings which are located radially outward on the lining carrier, apertures in the lining carrier and cover plate on one hand, and in the hub disc on the other hand, to hold springs which make possible a relative rotation between the friction linings end the hub when torque is exerted, characterized by the fact that the hub disc 7, 8 is engaged by means of an internal contour, in particular internal gear teeth 14, non-rotationally and without play in the circumferential direction in a corresponding external contour, in particular corresponding external gear teeth 13 of the hub 3, 4, 5; either the lining carrier 9 or cover plate 10, or both, are guided with respect to a guide diameter 15 of the hub 3, 4, 5 by means of a sliding or friction pairing, such as plastic/metal, for example.

Another feature of the invention resides broadly in the clutch plate characterized by the fact that the gear teeth 13, 14 are located in a radial region which lies between the radially inner areas of the windows for the springs 12 in the hub disc 7, 8 and the hub 3, 4, 5.

Yet another feature of the invention resides broadly in the clutch plate characterized by the fact that a bearing ring 16 preferably made of plastic is inserted in lining carriers 9 and/or cover plates 10, and is attached to the guide diameter 15 of a hub 3, 4 which preferably consists of metal.

Still another feature of the invention resides broadly in the clutch plate characterized By the fact that the bearing ring 16 has an essentially L-shaped cross section with a bearing body 18 which is inserted concentrically into the opening of the lining carrier 9 and/or cover plate 10 and a flange 17 which projects radially outward and is adjacent to the inside of the lining carrier 9 or cover plate 10.

A further feature of the invention resides broadly in the clutch plate characterized by the fact that the gear teeth 13, 14 are located between the inside and outside diameter of the bearing body 18 and flange 17.

Another feature of the invention resides broadly in the clutch plate characterized by the fact that a friction device 19, 20, 21 with a spring 23, 24, 25 which acts axially is located on the side of the gear teeth 13, 14 opposite the bearing ring 16.

Yet another feature of the invention resides broadly in the clutch plate characterized by the fact that the friction device 19 comprises a friction ring 26 which overlays the gear teeth 13, 14 in the radial direction.

Still another feature of the invention resides broadly in the clutch plate characterized by the fact that the width and material thickness of the hub and hub disc, at least in the vicinity of the gear teeth 13, 14 are coordinated with one another so that preferably the hub disc 7 has a smaller width than the hub 3, and there is some play in the axial direction between the bearing ring 16 and the friction device 19 with respect to the hub disc 7.

A further feature of the invention resides broadly in the clutch plate characterized by the fact that the friction device 20 is oriented so that it acts with respect to the hub disc 7 radially outside the gear teeth 13, 14 of the hub 3.

Another feature of the invention resides broadly in the clutch plate characterized by the fact that the friction device 20 consists at least of a friction ring 28 on the hub disc 7 and a spring 24 between the friction ring 28 and the inside wall of the lining carrier 9 or cover plate 10.

Yet another feature of the invention resides broadly in the clutch plate characterized by the fact that in the vicinity of the external gear teeth 13 of the hub 3, there is an additional friction ring 29 between the external gear teeth and the spring 24 of the friction device 20, 21.

Still another feature of the invention resides broadly in the clutch plate characterized by the fact that the hub 5 is made of plastic, and that the lining carrier 9 and/or cover plate 10 are attached to the guide diameter 15 of the hub 5 with essentially cylindrical extensions 32, 33 which point away from the gear teeth 13, 14.

A further feature of the invention resides broadly in the clutch plate characterized by the fact that the cylindrical extensions 32, 33 have an axial extension which has essentially the axial length of the hub 5, starting from the external gear teeth 13.

Another feature of the invention resides broadly in the clutch plate characterized by the fact that the external gear teeth 13 in the hub 5 extend over only a portion of its axial extension, and the remaining portion functions as an axial stop 34 for the hub disc 7, and on the side of the gear teeth 13 opposite the remaining portion there is a friction device 22 with a spring 25 which acts axially.

Yet another feature of the invention resides broadly in the clutch plate characterized by the fact that the spring 25 or a friction ring located between the spring 25 and the external gear teeth 13 extends radially beyond the external gear teeth 13, where it guarantees the axial fixing of the hub disc 7.

Still another feature of the invention resides broadly in the clutch plate characterized by the fact that the width of the hub disc 7 is coordinated to the axial length of the external gear teeth 13 of the hub 5 so that the hub disc 7 has some axial play.

A further feature of the invention resides broadly in the clutch plate characterized by the fact that pressure is exerted on the two friction rings 28, 29 by separate springs.

Another feature of the invention resides broadly in the clutch plate characterized by the fact that supported on an area of the cover plate 10 or lining carrier 9 there is a common spring 24 which acts by means of different flexible tabs 30, 31 on the respective friction ring 28, 29.

Yet another feature of the invention resides broadly in the clutch plate characterized by the fact that the external gear teeth 13 in the hub 4 extend only over a portion of its axial length, and the remaining portion functions as an axial stop 34 for the hub disc 7, and the friction device 19 is located on the side of the external gear teeth 13 opposite the remaining portion.

Still another feature of the invention resides broadly in the clutch plate characterized by the fact that the hub disc 8 is realized so that it is wider than the axial extent of the external gear teeth 13 of the hub 4.

A further feature of the invention resides broadly in the clutch plate characterized by the fact that the friction device 19 comprises a pressure ring 27 which is in contact with the friction ring 26 on the side of the friction ring 26 opposite the hub disc 8, and the spring 23 is located between the pressure ring 27 and the lining carrier 9 or cover plate 10.

Some types of neoprene plastics that could be utilized in accordance with the present invention may be or are disclosed by the following U.S. Pat. No. 5,266,856 to Holter, entitled "Vibration Reduction for Electric Motors"; U.S. Pat. No. 5,264,467 to DiStefano, entitled "High Performance Solvent-Free Contact Adhesive"; U.S. Pat. No. 5,281,651 to Arjunan and Kusznir, entitled "Compatibilization of Dissimilar Elastomer Blends Using Ethylene/AcrylateAcrylic Acid Tarpolymers"; and U.S. Pat. No. 5,324,758 to Takahashi et al., entitled "Vibration Damping Material of Asphalt Cement".

Some types of polyvinyl chloride plastics that could be utilized in accordance with the present invention may be or are disclosed by the following U.S. Pat. No. 5,209,931 to Levin, entitled "Stabilized PVC Products and their Production"; U.S. Pat. No. 5,210,140 to Greenlee, et al., entitled "Polyvinyl Chloride Blends"; U.S. Pat. No. 5,219,936 to Honkop et al., entitled "High Impact PVC/Polycarbonate Alloy Compositions"; U.S. Pat. No. 5,221,713 to Kempner et al., entitled "Co-microagglomeration of Emulsion Polymers (Encapsulated Core/Shell Additives for PVC)"; and U.S. Pat. No. 5,274,043 to Greenlee et al., entitled "Chlorinated PVC Blends".

Some examples of clutch assemblies and various components associated therewith which could possibly utilize the present invention may be disclosed in the following U.S. Pat. No. 4,684,007 to Maucher, entitled "Clutch Plate"; U.S. Pat. No. 4,635,780 to Wiggan, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Additional examples of clutch assemblies and various components associated therewith which could utilize the present invention may be disclosed in the following U.S. Pat. No. 5,117,959 entitled "Torsion Damping Device in Particular for Automotive Vehicles" to Valeo; U.S. Pat. No. 4,763,767 entitled "Torsional Damping Device" to Valeo; U.S. Pat. No. 4,667,801 entitled "Clutch Disc Arrangement" to Fichtel & Sachs; U.S. Pat. No. 5,238,096 entitled "Clutch Plate for a Motor vehicle Friction Clutch" to Fichtel & Sachs; and U.S. Pat. No. 5,016,744 entitled "Clutch Disc for a Friction Clutch", to Fichtel & Sachs.

Some examples of transmissions in which the present invention may be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of two-mass flywheels and the components thereof which may incorporate the present invention therein may be disclosed by the following U.S. Pat. No. 5,103,688 to Kuhne, entitled "Two-Mass Flywheel"; U.S. Pat. No. 4,777,843 to Bopp, entitled "Two-Mass Flywheel Assembly With Viscous Damping Assembly".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 29 870.6, filed on Aug. 23, 1994, having inventors Klaus Memmel, Jïrgen Kleifges, Reinhard Feldhaus, and Harald Jeppe, and DE-OS 44 29 870.6 and DE-PS 44 29 870.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly for a friction clutch for a motor vehicle, said friction clutch assembly comprising:

a flywheel;

a clutch housing;

a hub;

said hub defining an axis of rotation and an axial direction parallel to the axis o rotation;

a clutch disc disposed within said clutch housing, said clutch disc coaxially surrounding said hub;

pressure plate means disposed within said clutch housing and being movable in the axial direction, said pressure plate means fur applying an axial force to said clutch disc along the axial direction;

means for biasing said pressure plate means in the axial direction;

said flywheel comprising a centrifugal mass;

said centrifugal mass being disposed substantially adjacent said clutch disc and axially opposite said pressure plate means;

said clutch disc being disposed between said pressure plate means and said flywheel;

said clutch disc comprising friction lining means;

said friction lining means being disposed substantially between said pressure plate means and said flywheel;

a cover plate;

a hub disc;

said hub disc comprising an external portion an internal contour;

said external portion of said hub disc being disposed farther from said hub than is said internal contour of said hub said hub disc being disposed to coaxially surround said hub;

said hub disc being disposed adjacent said flywheel;

said cover plate being disposed substantially adjacent said hub disc;

said hub having an internal portion and an external portion;

said external portion of said hub being disposed farther from the axis of rotation than said internal portion of said hub;

said external portion of said hub comprising an external contour; and said internal contour of said hub disc and said external contour of said hub comprising means for meshing tightly with one another and for preventing substantial relative rotational movement between said hub and said hub disc upon engagement of said internal contour of said hub disc with said external contour of said hub.

2. The friction clutch assembly according to claim 1, wherein:

at least one of said clutch disc and said cover plate contacts said hub;

said at least one of said clutch disc and said cover plate being movable with respect to said hub;

said at least one of said clutch disc and said dover plate being in movable contact with said hub; and said movable contact being one of sliding and frictional contact.

3. The friction clutch assembly according to claim 2, wherein said contact is contact between metal and plastic.

4. The friction clutch assembly according to claim 3, wherein:

said friction clutch assembly further includes a plurality of springs;

said clutch disc comprises apertures;

said cover plate comprises apertures;

said hub disc comprises apertures;

said apertures of said clutch disc, said cover plate, and said hub disc are substantially aligned with one another;

said aligned apertures comprise windows;

said plurality of springs being disposed in said windows;

said windows are disposed radially outwardly from said hub;

said means for meshing on said external contour of said hub comprises a first set of gear teeth;

said means for meshing on said internal contour of said hub disc comprises a second set of gear teeth;

said first set of gear teeth and said second set of gear teeth are disposed radially between said windows and said internal portion of said hub; and said first set of gear teeth and said second set of gear teeth are in mesh with one another.

5. The friction clutch assembly according to claim 4, wherein:

said hub comprises an outer cylindrical surface;

said outer cylindrical surface of said hub comprises at least one guide surface and a radial extension;

said radial extension comprises an outer contour, said outer contour of said radial extension comprises said gear teeth of said hub; and said friction clutch assembly further comprises:

friction means for providing frictional force between said hub and at least one of said clutch disc and said cover plate, said friction means being disposed between said hub and said at least one of said clutch disc and said cover plate; and guiding means for guiding said at least one of said clutch disc and said cover plate with respect to said guide surface of said hub.

6. The friction clutch assembly according to claim 5, wherein:

said friction means comprises a bearing ring, said bearing ring comprising a plastic material; and said clutch disc comprises means for receiving said bearing ring, said bearing ring being disposed on said outer cylindrical surface of said hub.

7. The friction clutch assembly according to claim 6, wherein:

said guiding means comprises means for guiding said clutch disc with respect to said at least one guide surface of said hub at a distance from said at least one guide surface of said hub; and said guiding means is disposed between said clutch disc and said at least one guide surface of said hub; and said means for guiding at a distance comprises said bearing ring.

8. The friction clutch assembly according to claim 7, wherein:

said bearing ring comprises an essentially L-shaped cross section;

said L-shaped cross section of said bearing rang comprises
a bearing ring body;
a bearing ring flange;

said at least one of said cover plate and said clutch disc comprises said clutch disc;

said clutch disc coaxially surrounds said bearing ring body;

said bearing ring flange extends radially outward from said bearing ring body;

said bearing ring flange is disposed axially between said clutch disc and said radial extension of said hub;

said bearing ring body and bearing ring flange are disposed axially outside, and adjacent to, said gear teeth of said external contour of said hub;

said bearing ring body and said bearing ring flange are disposed axially outside, and adjacent to, said gear teeth of said internal contour of said hub disc;

said bearing ring comprises an inside diameter and an outside diameter;

said gear teeth of said external contour of said hub and said gear teeth of said internal contour of said hub disc are in mesh between said inside diameter of said bearing ring and said outside diameter of said bearing ring;

said friction clutch assembly further comprises second friction means for providing a frictional force between said hub and said cover plate;

said second friction means and said bearing ring are located on axially opposite sides of said radial extension of said hub and said internal contour of said hub disc;

said second friction means being disposed between:
said clutch disc; and
said radial extension of said hub and said internal contour of said hub disc; and said second friction means comprises a spring, said spring acting axially.

9. The friction clutch assembly according to claim 8, wherein said second friction means comprises a friction ring, said friction ring being disposed between:
said spring; and
said radial extension of said hub and said internal contour of said hub disc.

10. The friction clutch assembly according to claim 9, wherein:

said hub comprises a metal material;

said bearing ring is coaxially disposed on said one of said at least one guide surface of said hub;

said radial extension of said hub has a thickness dimension defined parallel to the axis of rotation;

said hub disc has a thickness dimension defined parallel to the axis of rotation; and said thickness dimension of said hub disc is less than said thickness dimension of said radial extension of said hub, to provide play in the axial direction between said bearing ring and said second friction means, with respect to said hub disc.

11. The friction clutch assembly according to claim 10, wherein:

said second friction means comprises a second friction ring and a second spring;

said second friction ring is disposed adjacent said hub disc; and said second spring is disposed between:
said second friction ring; and
said at least one of said clutch disc and said cover plate.

12. The friction clutch assembly according to claim 4, wherein:

said at least one of said clutch disc end said cover plate is guided with respect to said at least one guide surface of said hub by direct contact with said at least one guide surface of said hub.

13. The friction clutch assembly according to claim 12, wherein:

said hub comprises a plastic material;

said clutch disc and said cover plate each comprise a cylindrical extension;

said at least one guide surface of said hub comprises a first guide surface and a second guide surface;

said cylindrical extension of said clutch disc coaxially surrounds said first guide surface;

said cylindrical extension of said cover plate coaxially surrounds said second guide surface;

said cylindrical extension of said clutch disc extends in an axial direction away from said radial extension of said hub;

said cylindrical extension of said cover plate extends in an axial direction away from said radial extension of said hub;

each said cylindrical extension is about equal in length to he axial length of the corresponding one of said guide surfaces, the axial length of each said guide surface of said hub being measured from said radial extension of said hub to a corresponding axially outer surface of said hub;

said radial extension of said hub comprises a first portion and a second portion;

said first portion of said radial extension comprises said external contour of said hub;

said second portion of said radial extension of said hub extends radially beyond said gear teeth;

said second portion of said radial extension is disposed adjacent said hub disc;

said second portion of said radial extension comprises an axial stop for said hub disc;

said friction clutch assembly further comprises an ondular washer for biasing said radial extension of said hub against said clutch disc;

said ondular washer is disposed adjacent said first portion of said radial extension and axially opposite said second portion of said radial extension;

said ondular washer is disposed axially adjacent said external gear teeth of said first portion of said radial extension and said internal gear teeth of said hub disc;

said ondular washer extends radially beyond said external gear teeth of said first portion of said radial extension and said internal gear teeth of said hub disc;

the axial width of said hub disc is less than the axial width of said first portion of said radial extension of said hub, to permit axial play of said hub disc; and said ondular washer determines said axial play of said hub disc.

14. The friction clutch assembly according to claim 7, wherein:

said bearing ring comprises an essentially L-shaped cross section;

said L-shaped cross section of said bearing ring comprises:
a bearing ring body;
a bearing ring flange;

said at least one of said cover plate and said clutch disc comprises said clutch disc;

said clutch disc coaxially surrounds said bearing ring body;

said bearing ring flange extends radially outward from said bearing ring body;

said bearing ring flange is disposed axially between said clutch disc and said radial extension of said hub;

said Bearing ring body and said bearing ring flange are disposed axially outside, and adjacent to, said gear teeth of said external contour of said hub;

said bearing ring body and bearing ring flange are disposed axially outside, and adjacent to, said gear teeth of said internal contour of said hub disc;

said bearing ring comprises an inside diameter and an outside diameter;

said gear teeth of said external contour of said hub and said gear teeth of said internal contour of said hub disc are in mesh between said inside diameter of said bearing ring and said outside diameter of said bearing ring;

said friction clutch assembly further comprises second friction means, for providing a frictional force between said cover plate and said hub;

said second friction means and said bearing ring are located on axially opposite sides of said radial extension of said hub and said internal contour of said hub disc;

said second friction means comprises:
 a spring;
 a friction ring;
 said spring acting axially;
 said spring being disposed on said outer cylindrical surface of said hub;
 said friction ring being disposed on said outer cylindrical surface of said hub; and
 said friction ring being disposed adjacent said radial extension of said hub end said inner contour of said hub disc.

15. The friction clutch assembly according to claim 14, wherein:

said hub comprises a metal material;

said bearing ring is coaxially disposed on said one of said at least one guide surface of said hub;

said radial extension of said hub has a thickness dimension parallel to the axis of rotation;

said hub disc has a thickness dimension defined parallel to the axis of rotation;

said thickness dimension of said hub disc is less than said thickness dimension of said radial extension of said hub, to provide play in the axial direction between said bearing ring and said second friction means, with respect to said hub disc.

16. The friction clutch assembly according to claim 14, wherein:

said radial extension of said hub comprises a first portion and a second portion;

said first portion comprises said external contour of said hub;

said second portion of said radial extension of said hub extends radially beyond said gear teeth;

said second portion is disposed adjacent said hub disc;

said second portion comprises an axial stop for said hub disc;

said first portion of said radial extension of said hub has a thickness dimension defined parallel to the axis of rotation;

said hub disc has a thickness dimension defined parallel to the axis of rotation;

said thickness dimension of said hub disc is greater than said thickness dimension of said first portion of said radial extension of said hub;

said friction clutch assembly further comprises second friction means, for providing a frictional force between said cover plate and said hub;

said second fraction means is disposed between said cover plate and said radial extension of said hub;

said second friction means comprises a pressure ring and a spring for biasing said pressure ring;

said friction ring is disposed axially adjacent said hub disc;

said spring is disposed axially adjacent and axially inside said cover plate; and said pressure ring is disposed axially between said friction ring and said spring.

17. The friction clutch assembly according to claim 16, wherein:

said hub comprises a metal material; and said bearing ring is coaxially disposed on said one of said at least one guide surface of said hub.

* * * * *

UNITED STATES PATENT AND TRADEMARK OFFICE
CERTIFICATE OF CORRECTION

PATENT NO. : 5,617,939

DATED : April 8, 1997

INVENTOR(S) : Klaus MEMMEL, Jürgen KLEIFGES, Reinhard FELDHAUS and Harald JEPPE

It is certified that error appears in the above-identified patent and that said Letters Patent is hereby corrected as shown below:

On the title page, item [57], line 7 under the ABSTRACT section, after 'a', delete "plastic metal" and insert --plastic/metal--.

In column 2, line 1, after the first occurrence of 'or', delete "over" and insert --cover--.

In column 3, line 6, after 'ring', delete "or" and insert --for--.

In column 3, line 29, after 'individual' insert --parts from a--.

In column 3, line 60, before 'lining', delete "he" and insert --the--.

In column 4, line 30, after 'disc.' insert "In".

In column 5, line 40, after 'adjacent', delete "he" and insert --the--.

In column 6, line 53, after the first occurrence of 'ring' insert --27.--.

In column 9, line 8, after 'the', delete "fraction rang" and insert --friction ring--.

In column 9, line 12, after 'play' insert --of--.

UNITED STATES PATENT AND TRADEMARK OFFICE
CERTIFICATE OF CORRECTION

PATENT NO. : 5,617,939

DATED : April 8, 1997

INVENTOR(S) : Klaus MEMMEL, Jürgen KLEIFGES, Reinhard FELDHAUS and Harald JEPPE

It is certified that error appears in the above-identified patent and that said Letters Patent is hereby corrected as shown below:

In column 10, line 1, after 'be', delete "e" and insert --a--.

In column 10, line 9, after '21', delete "32 an each" and insert --can each be--.

In column 10, line 23, after the second occurrence of 'ring', delete "26,32" and insert --26,--.

In column 11, line 9, before 'exerted', delete "fords" and insert --force--.

In column 11, line 11, after the first occurrence of 'friction', delete "deride" and insert --device--.

In column 11, line 23, after 'to', delete "he" and insert --be--.

In column 12, line 15, after 'shows', delete "an-exploded" and insert --an exploded--.

In column 13, line 66, after 'plate', delete " 3" " and insert --35''--.

In column 14, line 53, after 'housing', delete " 27' " and insert --27''--.

In column 15, line 42, after 'linings', delete "end" and insert --and--.

UNITED STATES PATENT AND TRADEMARK OFFICE
CERTIFICATE OF CORRECTION

PATENT NO. : 5,617,939

DATED : April 8, 1997

INVENTOR(S) : Klaus MEMMEL, Jürgen KLEIFGES, Reinhard FELDHAUS and Harald JEPPE

It is certified that error appears in the above-identified patent and that said Letters Patent is hereby corrected as shown below:

In column 17, line 33, after 'Using', delete "Ethylene/AcrylateAcrylic" and insert --Ethylene/Acrylate/Acrylic--.

In column 17, line 34, after 'Acid' delete " Tarpolymers"; " and insert --Terpolymers";--.

In column 17, line 43, before 'et', delete "Honkop" and insert --Honkomp--.

In column 17, line 54, after 'to', delete "Wiggan," and insert --Wiggen,--.

In column 18, line 38, after 'Memmel,', delete "Jŀgen" and insert --Jürgen--.

In column 18, line 65, Claim 1, after 'axis', delete "o" and insert --of--.

In column 19, line 3, Claim 1, after 'means', delete "fur" and insert --for--.

In column 19, line 19, Claim 1, after 'portion', delete "an" and insert --and--.

In column 19, line 24, Claim 1, after 'hub' insert --disc;--.

In column 19, line 51, Claim 2, after the third occurrence of 'said', delete "dover" and insert --cover--.

UNITED STATES PATENT AND TRADEMARK OFFICE
CERTIFICATE OF CORRECTION

PATENT NO. : 5,617,939
DATED : April 8, 1997
INVENTOR(S) : Klaus MEMMEL, Jürgen KLEIFGES, Reinhard FELDHAUS and Harald JEPPE It is certified that error appears in the above-identified patent and that said Letters Patent is hereby corrected as shown below:

In column 20, line 55, Claim 8, after 'bearing', delete "rang" and insert --ring--.

In column 21, line 61, Claim 12, after 'disc', delete "end" and insert --and--.

In column 22, line 17, Claim 13, before 'axial', delete "he" and insert --the--.

In column 23, line 31, Claim 14, after 'hub', delete "end" and insert --and--.

Signed and Sealed this

Second Day of September, 1997

BRUCE LEHMAN

Attest:

Attesting Officer

Commissioner of Patents and Trademarks